United States Patent [19]

Saito

[11] 4,132,347
[45] Jan. 2, 1979

[54] MOISTURE PROOF BAGS PROVIDED WITH BLOW-IN PORTS AND METHOD OF MANUFACTURING THE SAME

[75] Inventor: Akio Saito, Tokorozawa, Japan

[73] Assignee: Showa Seitai Kogyo Kaisha Ltd., Tokyo, Japan

[21] Appl. No.: 811,444

[22] Filed: Jun. 29, 1977

[30] Foreign Application Priority Data

Jul. 7, 1976 [JP] Japan ............................ 51-89302[U]
Oct. 31, 1976 [JP] Japan ............................ 51-115718[U]

[51] Int. Cl.² ............................................ B65D 31/14
[52] U.S. Cl. .............................. 229/62.5; 229/DIG. 14
[58] Field of Search ............... 229/62.5, 55, DIG. 14; 150/9; 206/524.8

[56] References Cited

U.S. PATENT DOCUMENTS

| 2,593,328 | 4/1952 | Meaker | 229/55 |
| 2,778,173 | 1/1957 | Taunton | 206/524.8 |
| 3,248,041 | 4/1966 | Burke | 229/55 |

FOREIGN PATENT DOCUMENTS 23294  5/1930  Australia .................. 229/DIG. 14

Primary Examiner—Stephen P. Garbe
Attorney, Agent, or Firm—Wenderoth, Lind & Ponack

[57] ABSTRACT

A bag adapted to be packed with cement or the like by blowing it into the bag through a foldable blow-in port comprises an outer layer of synthetic resin which is impervious to air and moisture and an inner layer of paper bonded to the outer layer by a layer of bonding agent. The surface of the layer of the bonding agent facing the paper layer is provided with a plurality of longitudinal grooves which act as exhaust passages for discharging the air blown into the bag.

5 Claims, 19 Drawing Figures

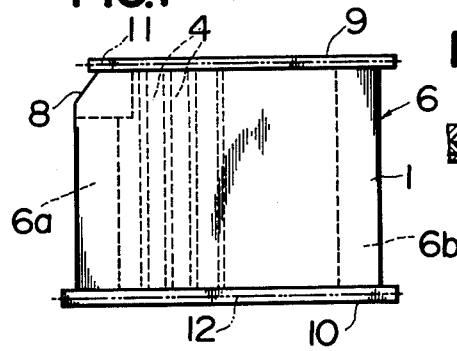
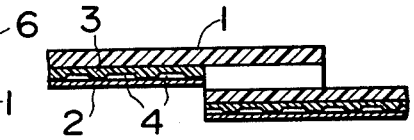
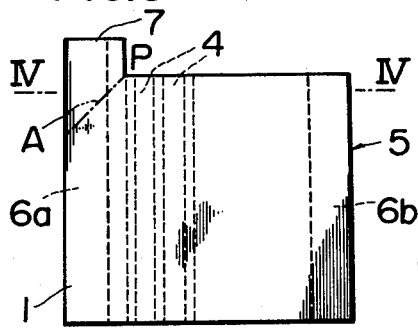
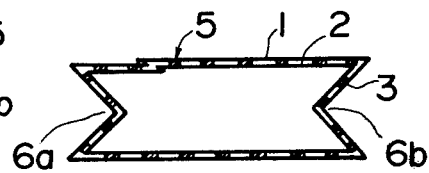
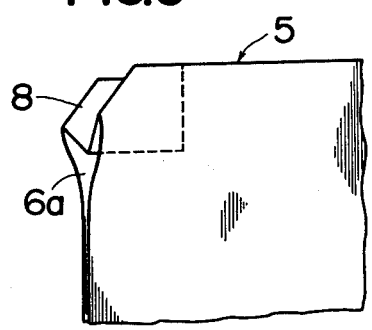
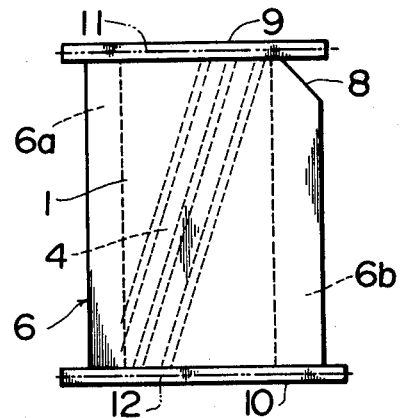

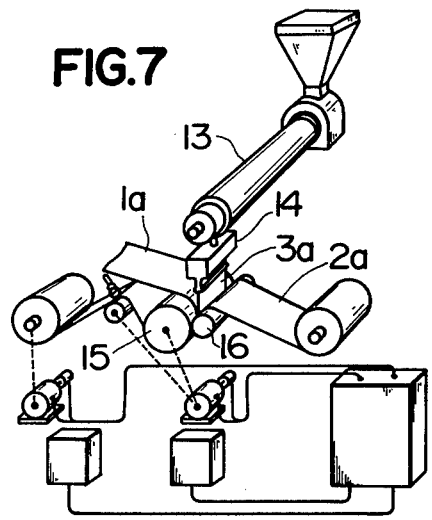
FIG.7
FIG.11
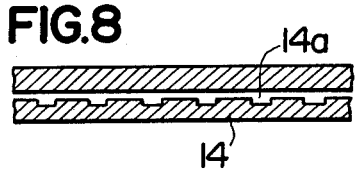
FIG.8
FIG.9
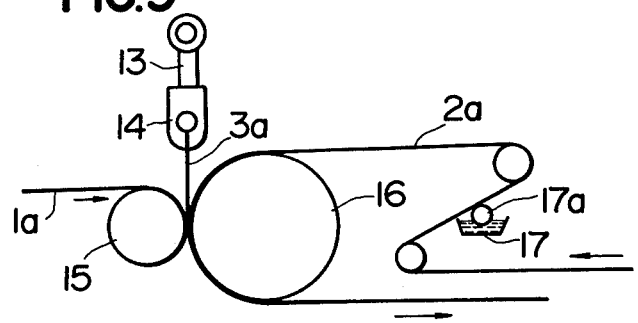
FIG.10
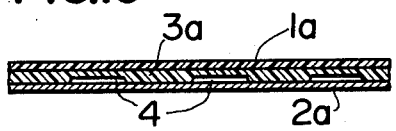

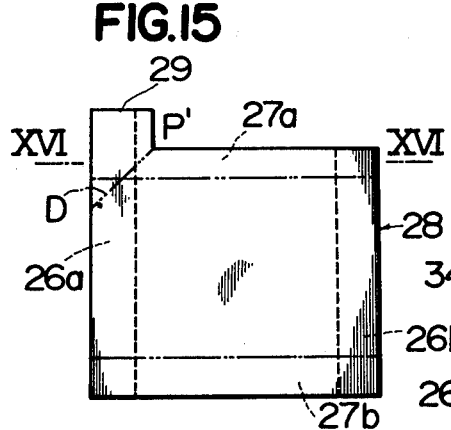
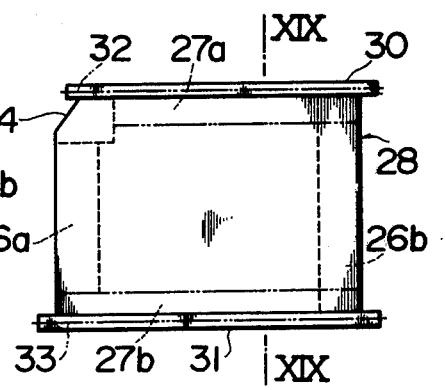
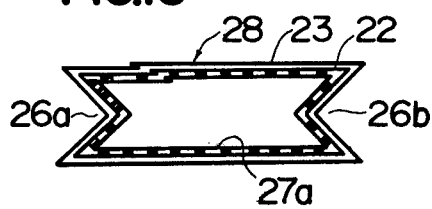
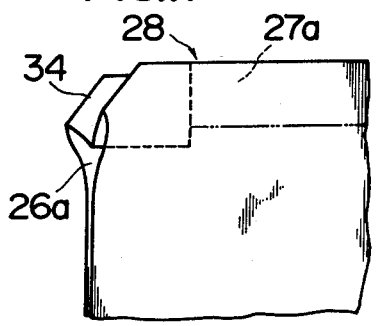
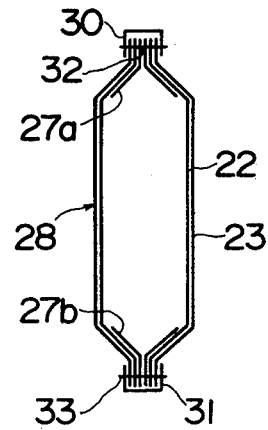

MOISTURE PROOF BAGS PROVIDED WITH BLOW-IN PORTS AND METHOD OF MANUFACTURING THE SAME

BACKGROUND OF THE INVENTION

This invention relates to a bag provided with a foldable blow-in port and adapted to be packed with such powdery material as cement.

Cement bags are generally made of several layers of kraft paper. Bags for domestic use comprise three layers whereas bags for export comprise six layers for increasing the strength.

Such cement bag is usually provided with a foldable blow-in port at one corner of its top end as will be described later and the top end and the bottom end of the bag are sewed to close the bag.

In recent years, cement bags are required to have improved strength and moisture proofness because of increased transportation distance and because it is necessary to prevent deterioration of cement while it is stored for a long time.

For this reason, multilayer construction has been used as inner layer kraft paper and as outer layer so-called "cloth-lami" made of a woven cloth of synthetic resin yarn and bonded with a sheet of the same synthetic resin, or so-called "cloth-kraft" comprising the "cloth lami" bonded with a sheet of kraft paper, or a lamination of two synthetic elongated films which have been laminated in orthogonal directions such as Trade name Valeron. When such outer layer is used, it is possible to improve the strength and moisture proofness.

However, the rigidity of the cement bag utilizing such materials is decreased because such materials are relatively soft and pliable so that it is difficult to charge powdery material into the bag. Moreover, as the bag has a small permeability to air when the cement is blown into the bag with air, the air cannot escape through the bag thus making difficult the blow in operation and decreasing the efficiency of handling the packed bag because it expands excessively.

Although it has been tried to increase the rigidity of bag by increasing the number of the inner layers of kraft paper, this solution increases the weight and cost of the bag.

As a result of a number of tests regarding packing of cement in bags, we have found the following facts.

1. The cement blown into the bag together with air accumulates in the bag whereas the air escapes through sewn part of the top and bottom ends of the bag whereby the bag is gradually filled with cement.
2. When the bag is swollen due to a small rigidity the air can not escape thus making it difficult to pack the cement.
3. When the material of the bag is soft the blow-in port which is normally folded in the bag will be projected to the outside due to the internal pressure created in the bag at the time of packing.
4. When the layer of synthetic material and the layer of kraft paper are not bonded together, the rigidity of the bag is small and the kraft paper which is used as the inner layer would be ruptured by shock since these two materials have different degree of elongation.
5. Where the top portion of the bag is hard, filling operation is especially easy.
6. Especially, the sewn portions at the top and the bottom ends should be reinforced and where reinforcing strips are used at these portions, the number of the layers of the bag may be reduced thus making it possible to reduce the cost.
7. When pin holes are formed through a bag utilizing films of synthetic resinous material for the purpose of discharging air, the moisture proofness is greatly reduced. Moreover, the cement blows out through the pin holes at the time of filling with the result that the operation environment is impaired.

SUMMARY OF THE INVENTION

It is an object of this invention to provide a novel bag provided with a foldable blow-in port and constructed by utilizing said facts and capable of solving the problems described above.

Another object of this invention is to provide a novel bag comprising an outer layer of a synthetic resin cloth or a synthetic resin film and an inner layer of kraft paper and wherein exhaust passages are formed between the kraft paper layer and the resin layer in the longitudinal direction of the bag thus rapidly exhausting air and improving the moisture proofness.

A further object of this invention is to provide a novel bag wherein reinforcing strip of paper is applied to the periphery of the bag at the top and bottom to increase the stiffness and thereby strength of these portions and to prevent projection of the foldable blow-in port out of the bag.

According to one aspect of this invention, there is provided a bag adapted to be packed with powdery material by blowing it into the bag together with air and of the type comprising an outer layer of synthetic resin which is impervious to air and moisture, an inner paper layer, and a foldable blow-in port at one corner of the bag, and the opposite ends of the bag are sewed to close the bag, characterized in that a plurality of exhaust passages are formed on the inside of said outer layer.

According to another aspect of this invention, there is provided a method of manufacturing a bag adapted to be packed with powdery material by blowing the same into the bag together with air, comprising the steps of laminating an outer layer of synthetic resin which is impervious to air and moisture, a layer of bonding material and an inner layer of paper in the order mentioned, the layer of bonding material being provided with a plurality of spaced longitudinal grooves on the surface thereof facing the inner paper layer, applying pressure to the lamination to bond together the inner and outer layers, bonding together the opposite side edges of the lamination to form a tubular body, forming a foldable blow-in port at one corner of the tubular body when it is flattened, applying paper strips to the opposite ends of the tubular body, and sewing the paper strips to the top and bottom ends of the tubular body, thereby completing a bag, said grooves forming exhaust passages for the air blown into the bag.

According to another aspect of this invention, there is provided a method of manufacturing a bag adapted to be packed with powdery material by blowing the same into the bag together with air, said method comprising the steps of applying a plurality of spaced stripes of water on one surface of a layer of paper in the longitudinal direction thereof, bonding the paper layer to a layer of synthetic resin which is impervious to air and moisture by means of a layer of molten bonding agent which is extruded between the layers with the stripes of water faced to the layer of molten bonding agent thus forming a lamination, evaporating the strips of water thereby forming a plurality of longitudinal exhaust passages, bonding together the opposite side edges of the lamination to form a tubular body, forming a foldable blow-in port at one corner of the tubular body when it is flattened, applying reinforcing strips to the opposite ends of the tubular body, and sewing the reinforcing strips to the top and bottom ends of the tubular body, thereby completing a bag.

According to a further aspect of this invention, there is provided a method of manufacturing a bag adapted to be packed with powdery material by blowing the same into the bag together with air, said method comprising the steps of applying stripe shaped bonding agent on one surface of a continuous web of paper at a definite spacing along the length of the web, the paper web onto a continuous web of synthetic resin which is impervious to air and moisture, bonding reinforcing strips to the web by the bonding agent, cutting the lamination into a length of a bag at the reinforcing strip, bonding together the opposite side edges of the cut length to form a tubular body with the synthetic resin layer located on the outside, forming a foldable blow-in port at one corner of the tubular body when it is flattened, sewing paper strips to the opposite ends of the tubular body thus completing a closed bag, said stripe shaped bonding agent forming a plurality of exhaust passages on the inside of said outer layer for the air blown into the bag.

BRIEF DESCRIPTION OF THE DRAWINGS

Further objects and advantages of the invention can be more fully understood from the following detailed description taken in conjunction with the accompanying drawings, in which FIG. 1 is a front view of one example of the bag embodying the invention;

FIG. 2 is an enlarged sectional view of a portion of the bag shown in FIG. 1;

FIG. 3 is a front view of the bag before folding the blow-in port;

FIG. 4 shows a cross-section of the bag taken along the line IV—IV in FIG. 3;

FIG. 5 is a perspective view of the bag for explaining the folding operation of the blow-in port;

FIG. 6 is a front view of a modified bag;

FIG. 7 is a perspective view showing one example of bonding a synthetic resin cloth and a sheet of paper;

FIG. 8 is a cross-sectional view showing a T die for extruding a molten bonding agent;

FIG. 9 is a side view showing another example of bonding together a synthetic resin cloth and a sheet of paper;

FIG. 10 is a sectional view of the cloth and paper bonded together by the method shown in FIG. 9;

FIG. 11 is a longitudinal sectional view of the bag embodying the invention showing the manner of exhausting air;

FIG. 15 is a front view of a bag before folding the foldable blow-in port;

FIG. 16 is a cross-sectional view of the bag shown in FIG. 15 taken along a line XVI — XVI;

FIG. 17 shows a portion of the bag shown in FIG. 15 useful to explain the manner of folding the blow-in port;

FIG. 18 is a front view of a completed bag; and

FIG. 19 is a sectional view of the bag shown in FIG. 18 taken along a line XIX — XIX after it has been filled with content.

DESCRIPTION OF THE PREFERRED EMBODIMENTS

Figure 12:
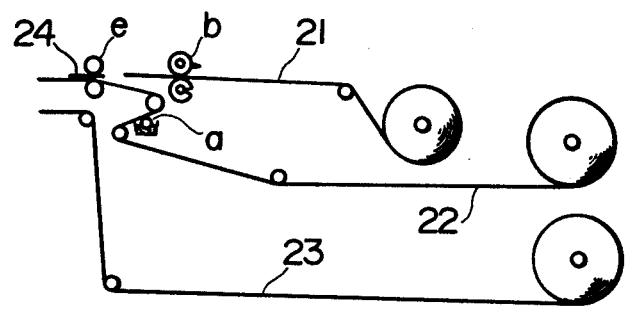
FIG. 12 is a diagrammatic side view for explaining a method of bonding together a sheet of relatively soft and pliable material and a sheet of paper.

Referring first to FIGS. 1 through 5, the bag 5 of this invention comprises a layer 1 of a woven cloth made of elongated fibers or yarn of such synthetic resin as polypropylene or polyethylene, and a layer of kraft paper especially preferred extensible paper such as trade name "clupak" bonded to the inner surface of the cloth layer 2 by means of a layer 3 of synthetic resin, for example polyethylene. A plurality of exhaust passages 4 are formed between the resin layer 3 and the paper layer 2 in the longitudinal direction of the bag and over the entire length thereof. As shown in FIG. 2, it is advantageous that the overlapped portions at the side edges of the cloth layer 1 are bonded together with a resinous binder of the same type as the synthetic resin layer 3 without providing the kraft paper layers 2 and exhaust passages 4.

As shown in FIGS. 3 and 4, the bag 5 is provided with V shaped folds 6a and 6b on both sides and a projection 7 at one upper corner. The projection is folded along a folding line A extending between the base of the projection and a point along the lefthand side edge to form the valley of the fold 6a along the folding line A as shown in FIG. 5 so as to form a blow-in port 8 which acts as a valve when it is folded. Folded paper strips 9 and 10 ride over the top and bottom ends of the bag as shown in FIG. 1 and then sewed to the bag by strings 11 and 12 so as to close the top and bottom of the bag.

FIG. 6 shows a modified bag which is similar to that shown in FIG. 1 except that the exhaust passages 4 are inclined with respect to the length of the bag.

A method and apparatus for bonding together the cloth layer 1 and the paper layer 2 by means of the synthetic resin layer 3 formed with the exhaust passages 4 is shown in FIG. 7. A T die 14 is mounted above the portions to be bonded together of the web of cloth 13a and a web of kraft paper 2a, and a film of molten resin 3a is extruded through the T die 14 by an extruder 13. As shown in FIG. 8, a plurality of grooves 14a are provided for the surface of the T die which faces the kraft paper web 2a. After the molten resin film 3a has been cooled slightly, the composite assembly is pressed by a pair of rollers 15 and 16 for forming exhaust passages by the ribs between the grooves 14a.

Another method and apparatus for forming a lamination of a cloth layer and a kraft paper layer formed with exhaust passages therebetween is shown in FIG. 9. In this example, spaced stripes of water, or water incorporated with an alcohol for improving permeability or water admixed with a powder of diatomaceous earth for improving peel off property are applied to one side of the kraft paper web 2a by a coating roller 17a of a coating machine 17. A film of molten resin 3a is extruded from an extruder 13 between the kraft paper web 2a and a synthetic resin cloth 1a fed from the opposite side and the assembly is clamped between a nip roller 15 and a cooling roller 16. Then, since the portions which have been coated with stripes of water or a water mixture do not bond a composite structure comprising paper layer 2a, resin layer 3a and cloth layer 1a can be obtained wherein exhaust passages 4 are formed on the surface of the resin layer 3a facing the paper layer 2a. More particularly, portions of the molten resin such as polyethylene exhausted through a T die do not adhere to the kraft paper layer since these portions are quenched by the water applied to the kraft paper, whereas the remaining surface of the molten resin adheres to the cloth. When the lamination prepared by the method shown in FIG. 7 is wound into a coil having a large diameter, due to the difference in the thickness of the portions coated with resin and not coated with resin it is difficult to form a coil having a large diameter. However, the lamination prepared by the method shown in FIG. 9 is easier to wind into a coil because only thin stripes of water were applied. After winding the lamination into a coil, the water spreads to the portions of the kraft paper not applied with water thus homogenizing the paper. Where a small quantity of diatomaceous earth is incorporated into water the permeability to air of the paper is improved. It should, however, be understood that other releasing agent other than diatomaceous earth can also be used. The water applied to the kraft paper supplement the water originally contained therein but lost by the heat of the molten resin so that the applied water improves the characteristics of the paper in addition to its cooling function.

It is also possible to form a plurality of exhaust passages along the entire length of the bag by applying stripes of a bonding agent on the surface of a cloth layer except the portions which later form the exhaust passages and then bonding the kraft paper.

As described above, according to this invention, since a plurality of exhaust passages are formed between the inner paper layer 2 and the outer synthetic resin layer, the air blown into the bag together with a powdery material such as cement permeates through the paper layer 2 and then discharges to the outside of the bag through the exhaust passages 4 and the sewn part at the top and bottom, especially the former, as shown by arrows in FIG. 11. For this reason, the bag does not swell when it is packed with the constant thus facilitating the packing operation. Since the paper layer 2 is partially bonded to the cloth layer 1 by the bonding agent, even when the paper layer 2 is pressed by the content, there is no fear of closing the exhaust passages. Since these passages are provided over the full length of the bag, air can readily be discharged to the outside of the bag through the sewn part at both ends. Since the resin cloth layer does not permeate air, the moisture proofness of the bag can be ensured. Moreover, when the lamination is cut to prepare bags, the fibers of the cloth do not separate.

It is advantageous to apply reinforcing paper strip to the inside of the paper layer at the top and preferably also at the bottom for reinforcing the top and the bottom and for preventing the projection of the folded blow-in port. One example of the method of manufacturing such a bag will be described with reference to FIGS. 12 through 18 of the accompanying drawings.

As shown in FIG. 12, webs 21 and 22 of paper having a relatively large rigidity such as kraft paper and a web 23 of such synthetic resin as polyethylene are paid out from respective coils and stripes of a bonding agent are sequentially applied with a definite spacing onto the web 22 by an applicater a. The web of kraft paper 21 is cut into definite lengths by a cutter b. The cut lengths are laminated onto the web 22 and then bonded thereto by a press e.

Figure 13:
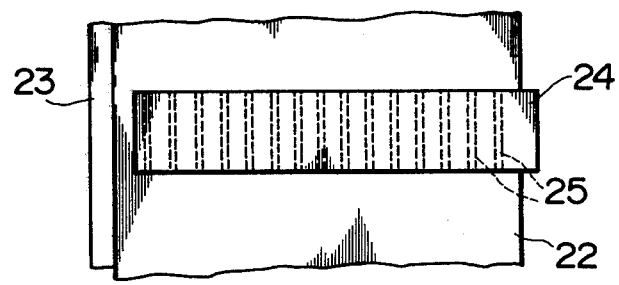
FIG. 13 is a plan view of a portion of FIG. 12.
Figure 14:
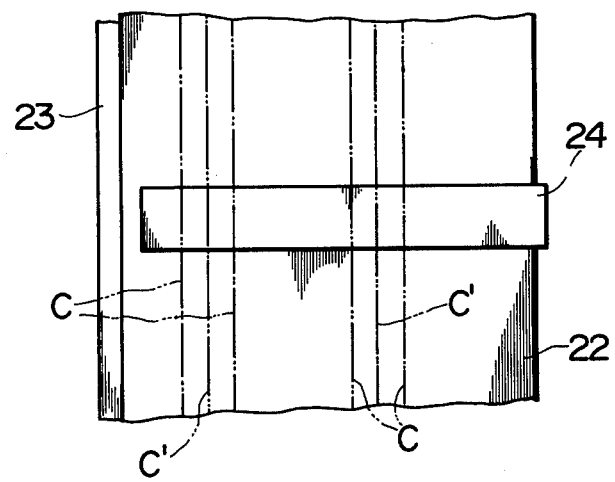
FIG. 14A is a plan view showing the manner of shearing the laminated sheets.
FIG. 14B is partial plan view showing the manner of shearing a cylindrical body.
Figure 14:
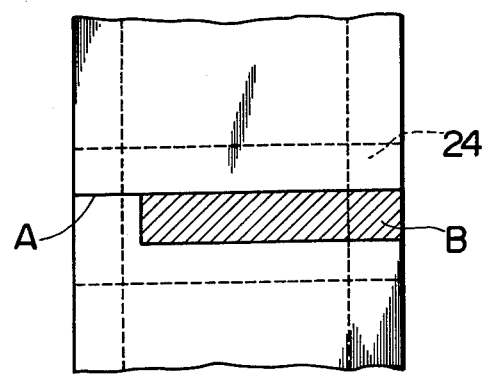

As shown in FIG. 13, a strip shaped reinforcing paper 24 prepared by cutting the web 21 is bonded to the web 22 with the reinforcing strip 24 displaced a little in the lateral direction with respect to the web 22. The bonding agent 25 is not applied onto the entire surface of the reinforcing strip 24 but applied in the form of longitudinal stripes as shown in FIG. 13.

The lamination comprising web 22 bonded with the reinforcing strip 24 and resin web 23 is folded along dot and dash lines c (FIG. 14A) and the edges of these folded sides are then bonded together thus forming a tubular body having V shaped folds on the opposite sides as shown in FIG. 14B. Then, the tubular body is cut along a cutting line A and a shaded portion B is removed whereby a tube can be obtained comprising an inner paper layer 22 having reinforcing paper strips bonded to the inner surfaces of the top and bottom and an outer synthetic resin layer 23. As shown in FIG. 15 and FIG. 16, the tube 28 is provided with V shaped folds 26a and 26b on both sides and reinforcing paper strips 27a and 27b around the inner surfaces of the top and bottom and can be used to form a bag. A projection 29 is left at one side of the top end. The projection 29 is folded along a folding line D extending from the base P' of the projection and intersects the lefthand side edge at an angle of 45° to form the valley of the fold 26a thus forming a blow-in port 34, as shown in FIG. 17. Then, as shown in FIG. 18 folded strips of paper 30 and 31 are mounted to stride the edges of the top and bottom and then sewed to the bag as at 32 and 33 to close the top and bottom.

In this embodiment, since reinforcing paper strips are bonded around the mouth and bottom of the bag not only the sewed portions are reinforced but also the relatively rigid inner paper layer and the reinforcing paper strips impart rigidity to the bag so that the bag will not swell when powdery material such as cement is blown into the bag together with air. Since the reinforcing strips 24 are bonded by stripe shaped bonding agent 25, in other words, since there are many exhaust passages at the sewed portions, the air can readily escape to the outside. Since the reinforcing paper strip is applied to the top where the blow-in port is provided, when packed bags are piled up the blow-in ports which have been folded into the bags would not be caused to project outwardly by the inner pressure created by the weight of the filed up bags. Accordingly, according to this invention it is possible to decrease the number of paper layers than the prior art cement bag comprising an outer layer of synthetic film and two or more inner paper layers. This saves material and cost.

What is claimed is:

1. In a bag comprising an outer layer of synthetic resin which is impervious to air and moisture, an inner paper layer and a foldable blow-in port provided at one corner of the bag for blowing powdery material into the bag together with air, the opposite ends of the bag being sewed to close the bag, the improvement in the bag wherein said outer layer is bonded to said inner paper layer by means of a layer of a bonding agent which is provided with a plurality of substantially longitudinal grooves on the surface thereof facing said inner paper layer, said grooves extending along the entire length of said bag and constituting exhaust passages.

2. The bag according to claim 1 wherein said exhaust passages are parallel with the longitudinal axis of the bag.

3. The bag according to claim 1 wherein said inner paper layer is applied with a plurality of spaced longitudinal stripes of water on the surface facing said layer of the bonding agent, said stripes of water evaporating after bonding thus forming said exhaust passages which extends over the entire length of the bag.

4. The bag according to claim 1 wherein reinforcing strips are bonded to the inner peripheries of the top and bottom of said bag and sewed to the bag to close the same, said reinforcing strips being bonded to said inner paper layer by means of a plurality of spaced stripes of a bonding agent extending in the longitudinal direction of said bag.

5. The bag according to claim 1 wherein a reinforcing paper strip provided with a plurality of spaced longitudinal exhaust passages is bonded to one end of said bag which is provided with said foldable blow-in port.

* * * * *